(12) United States Patent
Hong et al.

(10) Patent No.: US 9,535,568 B2
(45) Date of Patent: Jan. 3, 2017

(54) MOBILE TERMINAL AND METHOD OF CONTROLLING THE SAME

(75) Inventors: Jiyoung Hong, Seoul (KR); Penugonda Chandra Sekhar, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1048 days.

(21) Appl. No.: 13/194,743

(22) Filed: Jul. 29, 2011

(65) Prior Publication Data

US 2012/0042272 A1 Feb. 16, 2012

(30) Foreign Application Priority Data

Aug. 12, 2010 (KR) ........................ 10-2010-0077926

(51) Int. Cl.
| | |
|---|---|
| G06F 3/0481 | (2013.01) |
| G06F 3/0488 | (2013.01) |
| H04M 1/725 | (2006.01) |
| G06F 3/0486 | (2013.01) |

(52) U.S. Cl.
CPC ......... *G06F 3/04817* (2013.01); *G06F 3/0481* (2013.01); *G06F 3/0486* (2013.01); *G06F 3/04883* (2013.01); *G06F 3/04886* (2013.01); *H04M 1/72583* (2013.01)

(58) Field of Classification Search
CPC .. G06F 3/0482; G06F 3/04817; G06F 3/0488; G06F 3/04842; G06F 3/0486
USPC ............... 715/245, 247, 520, 724, 770, 810, 835,715/837; 345/348
See application file for complete search history.

(56) References Cited

U.S. PATENT DOCUMENTS

| | | | | |
|---|---|---|---|---|
| 5,230,063 A | * | 7/1993 | Hoeber et al. | ................ 715/840 |
| 5,461,710 A | | 10/1995 | Bloomfield et al. | |
| 5,598,524 A | * | 1/1997 | Johnston et al. | ............. 715/769 |
| 5,625,818 A | * | 4/1997 | Zarmer et al. | |
| 5,692,140 A | * | 11/1997 | Schmitt et al. | ............... 715/856 |
| 5,754,178 A | * | 5/1998 | Johnston et al. | ............. 715/769 |
| 5,760,773 A | * | 6/1998 | Berman et al. | ............... 715/808 |
| 6,327,586 B1 | * | 12/2001 | Kisiel | |
| 7,636,898 B2 | * | 12/2009 | Takahashi | ..................... 715/769 |
| 7,672,468 B2 | | 3/2010 | Kaiser et al. | |

(Continued)

FOREIGN PATENT DOCUMENTS

| | | |
|---|---|---|
| EP | 1 760 572 A1 | 3/2007 |
| EP | 2 045 705 A2 | 4/2009 |
| KR | 10-2010-0042400 A | 4/2010 |

OTHER PUBLICATIONS

Frakes, "Hands on with iOS 4 Folders," Macworld, Jun. 21, 2010, XP002726352, http://www.macworld.com/article/1152168/ios4folders.html, pp. 1-8.

*Primary Examiner* — Jeffrey A Gaffin
*Assistant Examiner* — Nhat-Huy T Nguyen
(74) *Attorney, Agent, or Firm* — Birch, Stewart, Kolasch & Birch, LLP

(57) ABSTRACT

A method of controlling a mobile terminal includes displaying, on a display module of the mobile terminal, an operation screen on which a plurality of icons including a first icon and a second icon are arranged, displaying at least one pocket area on one side of the operation screen, receiving, on the display module, a dragging input for dragging the first icon into the at least one pocket area, wherein the first icon disappears into the pocket area as a result of the dragging input, and displaying the second icon at a location where the disappeared first icon was originally displayed.

16 Claims, 11 Drawing Sheets

(56) References Cited

U.S. PATENT DOCUMENTS

| | | | |
|---|---|---|---|
| 7,908,569 B2* | 3/2011 | Ala-Rantala | 715/853 |
| 8,266,550 B1* | 9/2012 | Cleron et al. | 715/863 |
| 8,452,339 B2* | 5/2013 | Lee et al. | 455/566 |
| 8,717,321 B2* | 5/2014 | Kim | 345/173 |
| 8,922,494 B2* | 12/2014 | Min et al. | 345/173 |
| 2002/0049978 A1* | 4/2002 | Rodriguez et al. | 725/86 |
| 2002/0065856 A1* | 5/2002 | Kisiel | 707/530 |
| 2003/0222915 A1* | 12/2003 | Marion et al. | 345/769 |
| 2003/0234768 A1* | 12/2003 | Rekimoto et al. | 345/169 |
| 2004/0027793 A1* | 2/2004 | Haraguchi et al. | 361/683 |
| 2005/0043015 A1* | 2/2005 | Muramatsu | 455/412.1 |
| 2005/0289476 A1 | 12/2005 | Tokkonen | |
| 2006/0026254 A1* | 2/2006 | Kessen et al. | 709/207 |
| 2006/0238517 A1* | 10/2006 | King et al. | 345/173 |
| 2007/0171046 A1* | 7/2007 | Diem | 340/539.13 |
| 2008/0040668 A1* | 2/2008 | Ala-Rantala | 715/713 |
| 2008/0158189 A1* | 7/2008 | Kim | 345/173 |
| 2008/0229224 A1* | 9/2008 | Kake | 715/769 |
| 2008/0270977 A1* | 10/2008 | Nucci et al. | 717/105 |
| 2009/0112615 A1* | 4/2009 | Janicki | 705/2 |
| 2009/0174679 A1* | 7/2009 | Westerman | 345/173 |
| 2009/0178008 A1* | 7/2009 | Herz et al. | 715/840 |
| 2009/0244019 A1* | 10/2009 | Choi | 345/173 |
| 2010/0088634 A1* | 4/2010 | Tsuruta et al. | 715/800 |
| 2010/0100855 A1* | 4/2010 | Yoo | 715/863 |
| 2010/0205566 A1* | 8/2010 | Matoba | 715/838 |
| 2010/0251152 A1* | 9/2010 | Cho et al. | 715/765 |
| 2011/0072373 A1* | 3/2011 | Yuki | 715/764 |
| 2011/0128244 A1* | 6/2011 | Cho et al. | 345/173 |
| 2011/0252346 A1* | 10/2011 | Chaudhri | 715/765 |
| 2012/0092346 A1* | 4/2012 | Ording et al. | 345/473 |
| 2012/0297328 A1* | 11/2012 | Tanaka et al. | 715/769 |
| 2014/0015786 A1* | 1/2014 | Honda | 345/173 |
| 2014/0258903 A1* | 9/2014 | Kanbara et al. | 715/765 |

* cited by examiner (a)          (b)

(a)  (b)

(a)            (b)

MOBILE TERMINAL AND METHOD OF CONTROLLING THE SAME

CROSS-REFERENCE TO RELATED APPLICATION

This application claims the priority benefit of Korean Patent Application No. 10-2010-0077926, filed on Aug. 12, 2010 in the Korean Intellectual Property Office, the disclosure of which is incorporated herein by reference.

BACKGROUND OF THE INVENTION

1. Field of the Invention

The present invention relates to a mobile terminal and a method of controlling the mobile terminal, and more particularly, to a mobile terminal and a method of controlling the mobile terminal, in which a pocket area can be set on one side of a screen and can thus be used for various purposes such as creating a new folder.

2. Description of the Related Art

Mobile terminals are portable devices, which can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless interne services and have thus evolved into multimedia players.

However, due to diversification of the types of functions provided by mobile terminals, menu structures for controlling the operation of mobile terminals have increasingly become complicated, and the number of icons that need to be displayed on the screens of mobile terminals has increased. Smart phones, in particular, may often be required to display many icons, including not only basic function icons but also icons representing applications downloaded by users, on their idle or main operating screens. However, when there are too many icons displayed on an idle screen or a main operating screen, the icons may not be able to be properly managed, thereby making it difficult and time-consuming to search for desired icons or perform desired functions.

Therefore, a method is needed to effectively manage even a large number of icons on the screens of mobile terminals.

SUMMARY OF THE INVENTION

The present invention provides a mobile terminal and a method of controlling the mobile terminal, in which a pocket area can be set on one side of a screen and can thus be used for various purposes such as creating a new folder.

According to an aspect of the present invention, there is provided a method of controlling a mobile terminal, the method including displaying an operation screen on which a plurality of icons are arranged on a display module; providing at least one pocket area on one side of the operation screen; if a first icon, which is one of the plurality of icons, is dragged into the pocket area, making the first icon disappear into the pocket area; and displaying a second icon at a location where the first icon was originally displayed.

According to another aspect of the present invention, there is provided a mobile terminal including a display module configured to display thereon an operation screen on which a plurality of icons are arranged; and a controller configured to provide at least one pocket area on one side of the operation screen, wherein, if a first icon, which is one of the plurality of icons, is dragged into the pocket area, the controller is configured to make the first icon disappear into the pocket area and display a second icon at a location where the first icon was originally displayed.

According to another aspect of the present invention, there is provided a method of controlling a mobile terminal, the method including displaying an operation screen on which a plurality of objects are arranged on a display module; providing at least one pocket area on one side of the operation screen; if a first object, which is one of the plurality of objects, is dragged into the pocket area, making the first icon disappear into the pocket area; and saving the first object in a folder for performing a predefined function.

According to another aspect of the present invention, there is provided a mobile terminal including a display module configured to display thereon an operation screen on which a plurality of objects are arranged; and a controller configured to provide at least one pocket area on one side of the operation screen, wherein, if a first object, which is one of the plurality of objects, is dragged into the pocket area, the controller is configured to make the first icon disappear into the pocket area and save the first object in a folder for performing a predefined function.

According to an embodiment of the present invention, a method of controlling a mobile terminal includes displaying, on a display module of the mobile terminal, an operation screen on which a plurality of icons including a first icon and a second icon are arranged, displaying at least one pocket area on one side of the operation screen, receiving, on the display module, a dragging input for dragging first icon into the at least one pocket area, wherein the first icon disappears into the pocket area as a result of the dragging input, and displaying the second icon at a location where the disappeared first icon was originally displayed.

According to an embodiment of the present invention, a mobile terminal includes a display module configured to display an operation screen on which a plurality of icons including a first icon and a second icon are arranged and a controller configured to display at least one pocket area on one side of the operation screen, to control the first icon to disappear into the at least one pocket area when the first icon is dragged into the at least one pocket area, and to display the second icon at a location where the disappeared first icon was originally displayed.

According to an embodiment of the present invention, a method of controlling a mobile terminal includes displaying, on a display module of the mobile terminal, an operation screen on which a plurality of objects including a first object are arranged, displaying at least one pocket area on one side of the operation screen, receiving, on the display module, a dragging input for dragging a first object into the at least one pocket area, wherein the first object disappears into the pocket area; and saving the first object in a folder for performing a predefined function.

According to an embodiment of the present invention, a mobile terminal includes a display module configured to display an operation screen on which a plurality of objects including a first object are arranged and a controller configured to display at least one pocket area on one side of the operation screen, to control the first object to disappear into the at least one pocket area when the first object is dragged into the at least one pocket area, and to save the first object in a folder for performing a predefined function.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), a navigation device, a tablet computer, or an electronic book (e-book) reader. In this disclosure, the terms 'module' and 'unit' can be used interchangeably.

Figure 1:
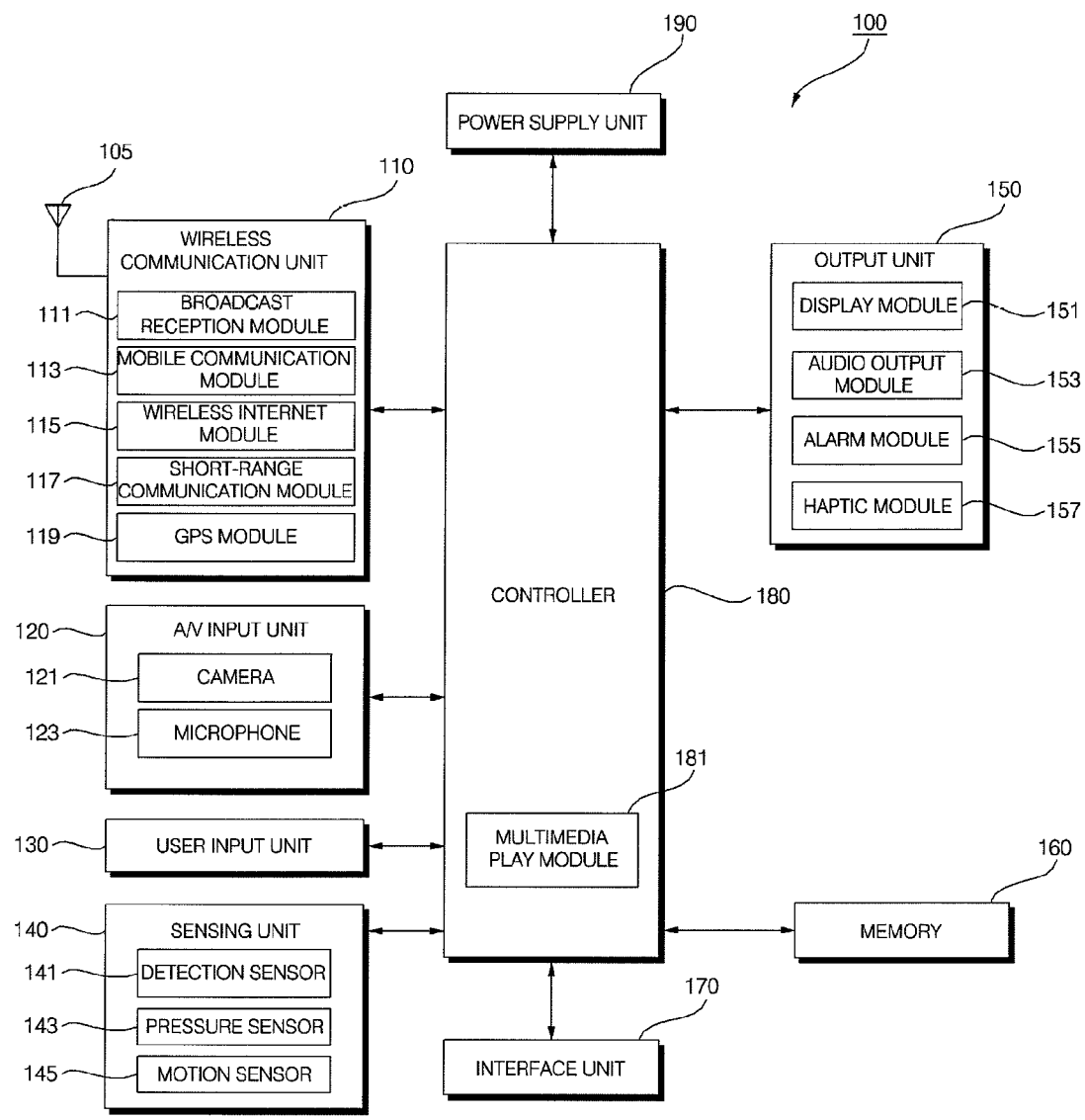
FIG. 1 illustrates a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless internet module 115, a short-range communication module 117, and a global positioning system (GPS) module 119.

The broadcast reception module 111 may receive a broadcast signal and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms. For example, the broadcast-related information may be electronic program guide (EPG) of digital multimedia broadcasting (DMB) or may be electronic service guide (ESG) of digital video broadcast-handheld (DVB-H).

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 111 may be configured to be suitable for nearly all types of broadcasting systems other than those set forth herein. The broadcast signal and/or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may be embedded in the mobile terminal 100 or may be installed in an external device. The wireless internet module 115 may use various wireless internet technologies such as wireless local area network (WLAN), Wireless Broadband (WiBro), World Interoperability for Microwave Access (Wimax), and High Speed Downlink Packet Access (HSDPA).

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera 121 and a microphone 123. The camera 121 may process various image frames such as still images or moving images captured by an image sensor during a video call mode or an image capturing mode. The image frames processed by the camera 121 may be displayed by a display module 151.

The image frames processed by the camera 121 may be stored in the memory 160 or may be transmitted to an external device through the wireless communication unit 110. The mobile terminal 100 may include two or more cameras 121.

The microphone 123 may receive external sound signals during a call mode, a recording mode, or a voice recognition mode with the use of a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 may generate key input data based on user input for controlling the operation of the mobile terminal 100. The user input unit 130 may be implemented as a keypad, a dome switch, or a static pressure or capacitive touch pad which is capable of receiving a command or information by being pushed or touched by a user. Alternatively, the user input unit 130 may be implemented as a wheel, a jog dial or wheel, or a joystick capable of receiving a command or information by being rotated. Still alternatively, the user input unit 130 may be implemented as a finger mouse. In particular, if the user input unit 130 is implemented as a touch pad and forms a mutual layer structure with the display module 151, the user input unit 130 and the display module 151 may be collectively referred to as a touch screen.

The sensing unit 140 determines a current state of the mobile terminal 100 such as whether the mobile terminal 100 is opened up or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The sensing unit 140 may include a detection sensor 141, a pressure sensor 143 and a motion sensor 145. The detection sensor 141 may determine whether there is an object nearby and approaching the mobile terminal 100 without any mechanical contact with the entity. More specifically, the detection sensor 141 may detect an object that is nearby and approaching by detecting a change in an alternating magnetic field or the rate of change of static capacitance. The sensing unit 140 may include two or more detection sensors 141.

The pressure sensor 143 may determine whether pressure is being applied to the mobile terminal 100 or may measure the level of pressure, if any, applied to the mobile terminal 100. The pressure sensor 143 may be installed in a certain part of the mobile terminal 100 where the detection of pressure is necessary. For example, the pressure sensor 143 may be installed in the display module 151. In this case, it is possible to differentiate a typical touch input from a pressure touch input, which is generated using a higher pressure level than that used to generate a typical touch input, based on data provided by the pressure sensor 143. In addition, when a pressure touch input is received through the display module 151, it is possible to determine the level of pressure applied to the display module 151 upon the detection of a pressure touch input based on data provided by the pressure sensor 143.

The motion sensor 145 may determine the location and motion of the mobile terminal 100 using an acceleration sensor or a gyro sensor.

In the meantime, acceleration sensors are a type of device for converting a vibration in acceleration into an electric signal. With recent developments in micro-electromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices. In general, one or more acceleration sensors representing two or three axial directions are incorporated into a single package. There are some cases when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate.

Gyro sensors are sensors for measuring angular velocity, and may determine the relative direction of the rotation of the mobile terminal 100 to a reference direction.

The output unit 150 may output audio signals, video signals and alarm signals. The output unit 150 may include the display module 151, an audio output module 153, an alarm module 155, and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a layer structure together and are thus implemented as a touch screen, the display module 151 may be used as both an output device and an input device. If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is received, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include electronic paper (e-paper). E-paper is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 may be implemented as e-paper by using electrostatic-charged hemispherical twist balls, using electrophoretic deposition, or using microcapsules.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output an alarm signal upon receiving a call signal or a message. In addition, the alarm module 155 may receive a key signal and may output an alarm signal as feedback to the key signal. Therefore, the user may be able to easily recognize the occurrence of an event based on an alarm signal output by the alarm module 155. An alarm signal for notifying the user of the occurrence of an event may be output not only by the alarm module 155 but also by the display module 151 or the audio output module 153.

The haptic module 157 may provide various haptic effects (such as vibration) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

When the mobile terminal 100 is connected to an external cradle, the interface unit 170 may provide a path for supplying power from the external cradle to the mobile terminal 100 or for transmitting various signals from the external cradle to the mobile terminal 100.

The controller 180 may control the general operation of the mobile terminal 100. For example, the controller 180 may perform various control operations regarding making/receiving a voice call, transmitting/receiving data, or making/receiving a video call. The controller 180 may include a multimedia player module 181, which plays multimedia data. The multimedia player module 181 may be implemented as a hardware device and may be installed in the controller 180. Alternatively, the multimedia player module 181 may be implemented as a software program.

The power supply unit 190 may be supplied with power by an external power source or an internal power source and may supply power to the other components in the mobile terminal 100.

The mobile terminal 100 may include a wired/wireless communication system or a satellite communication system and may thus be able to operate in a communication system capable of transmitting data in units of frames or packets.

The exterior structure of the mobile terminal 100 will hereinafter be described in detail with reference to FIGS. 2 and 3. The present invention can be applied to nearly all types of mobile terminals such as a folder-type, a bar-type, a swing-type and a slider-type mobile terminal. However, for convenience, it is assumed that the mobile terminal 100 is a bar-type mobile terminal equipped with a full touch screen.

Figure 2:
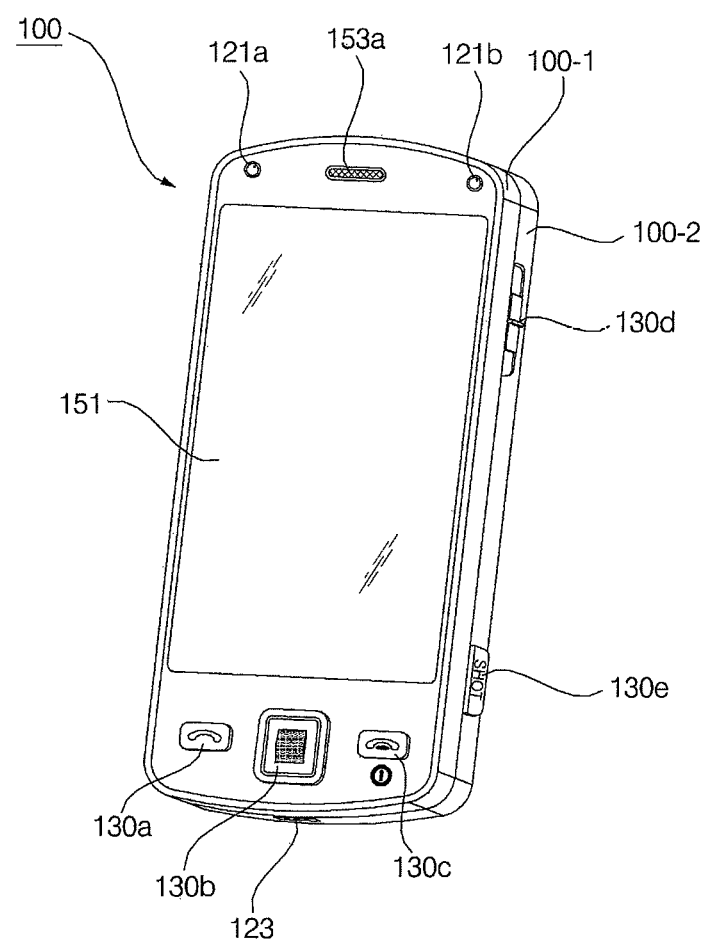
FIG. 2 illustrates a front perspective view of the mobile terminal shown in FIG. 1.
Figure 3:
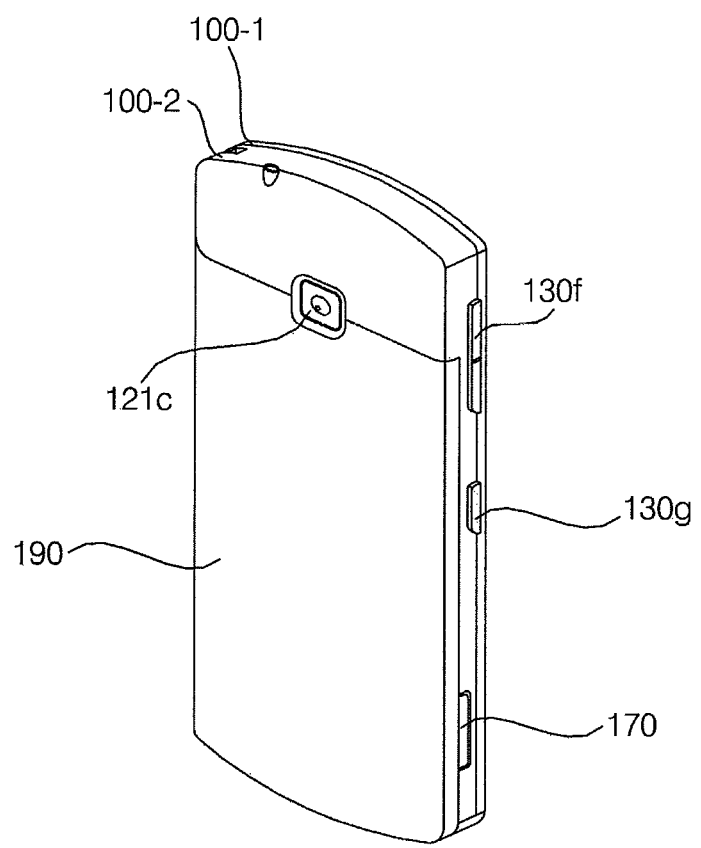
FIG. 3 illustrates a rear perspective view of the mobile terminal shown in FIG. 2.

FIG. 2 illustrates a front perspective view of the mobile terminal 100, and FIG. 3 illustrates a rear perspective view of the mobile terminal 100. Referring to FIG. 2, the exterior of the mobile terminal 100 may be formed by a front case 100-1 and a rear case 100-2. Various electronic devices may be installed in the space formed by the front case 100-1 and the rear case 100-2. The front case 100-1 and the rear case 100-2 may be formed of a synthetic resin through injection molding. Alternatively, the front case 100-1 and the rear case 100-2 may be formed of a metal such as stainless steel (STS) or titanium (Ti).

The display module 151, a first audio output module 153a, a first camera 121a, and first through third user input modules 130a through 130c may be disposed in the main body of the mobile terminal 100, and particularly, on the front case 100-1. Fourth and fifth user input modules 130*d* and 130*e* and the microphone 123 may be disposed on one side of the rear case 100-2.

If a touch pad is configured to overlap the display module 151 and thus to form a mutual layer structure, the display module 151 may serve as a touch screen. Thus, the user can enter various information to the mobile terminal 100 simply by touching the display module 151.

The first audio output module 153*a* may be implemented as a receiver or a speaker. The first camera 121*a* may be configured to be suitable for capturing a still or moving image of the user. The microphone 123 may be configured to properly receive the user's voice or other sounds.

The first through fifth user input modules 130*a* through 130*e* and sixth and seventh user input modules 130*f* and 130*g* may be collectively referred to as the user input unit 130, and any means can be employed as the first through seventh user input modules 130*a* through 130*f* so long as it can operate in a tactile manner. For example, the user input unit 130 may be implemented as a dome switch or a touch pad that can receive a command or information according to a pressing or a touch operation by the user, or may be implemented as a wheel or jog type for rotating a key or as a joystick. In terms of function, the first through third user input modules 130*a* through 130*c* may operate as function keys for entering a command such as start, end, or scroll, the fourth user input module 130*d* may operate as a function key for selecting an operating mode for the mobile terminal 100, and the fifth user input module 130*e* may operate as a hot key for activating a special function within the mobile terminal 100.

Referring to FIG. 3, a second camera 121*b* may be additionally provided at the rear of the rear case 100-2, and the sixth and seventh user input modules 130*f* and 130*g* and the interface unit 170 may be disposed on one side of the rear case 100-2.

The second camera 121*b* may have an image capture direction which is substantially the opposite to that of the first camera 121*a*, and may have a different resolution from that of the first camera 121*a*.

A flash and a mirror may be disposed to be adjacent to the second camera 121*b*. When an image of a subject is captured with the second camera 121*b*, the flash may illuminate the subject. The mirror may allow the user to see him- or herself when he or she wants to capture his or her own image by using the second camera 121*b*.

Another audio output module (not shown) may be additionally provided on the rear case 100-2. The audio output module on the rear case 100-2 may realize a stereo function along with the audio output module 153 on the front case 100-1. The audio output module on the rear case 100-2 may also be used in a speaker-phone mode.

The interface unit 170 may used as a passage allowing the mobile terminal 100 to exchange data with an external device either through a fixed line or wirelessly.

A broadcast signal reception antenna may be disposed at one side of the front or rear case 100-1 or 100-2, in addition to an antenna used for call communication. The broadcast signal reception antenna may be installed such that it can be extended from the front or rear case 100-1 or 100-2.

The power supply unit 190 may be mounted on the rear case 100-2 and may supply power to the mobile terminal 100. The power supply unit 190 may be, for example, a chargeable battery which can be detachably combined to the rear case 100-2 for being charged.

The second camera 121*b* and the other elements that have been described as being provided on the rear case 100-2 may be provided on the front case 100-1. In addition, the first camera 121*a* may be configured to be rotatable and thus to allow image capturing in various directions. In this case, the second camera 121*b* may be optional.

Figure 4:
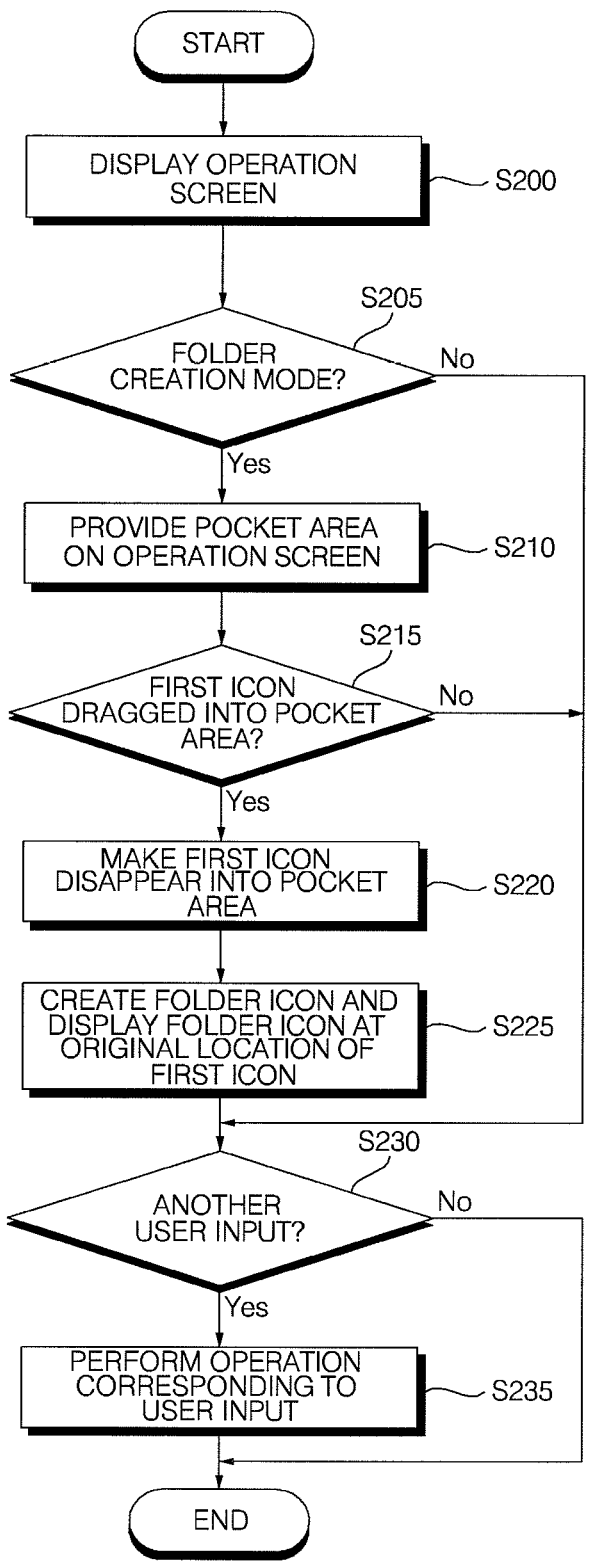
FIG. 4 illustrates a flowchart of a method of controlling a mobile terminal, according to an exemplary embodiment of the present invention.

FIG. 4 illustrates a flowchart of a method of controlling a mobile terminal, according to an exemplary embodiment of the present invention. Referring to FIG. 4, the controller 180 may display an operation screen on which a predefined number of icons displayed on the display module 151 (200). Examples of the operation screen include, but are not limited to, a main screen that can be displayed on the display module 151 when the booting of the mobile terminal 100 is complete or the mobile terminal 100 is released from a lock state, and a menu screen that can be displayed on the display module 151 in response to, for example, a user command.

Thereafter, if a folder creation mode is selected in response to a predetermined user input (S205), the controller 180 may provide a pocket area at the top or bottom or on the left or right side of the operation screen (S210).

The folder creation mode may be selected by touching a particular area or a particular icon on the operation screen or by touching any one of the plurality of icons on the operation screen for more than a predefined amount of time or with pressure higher than a predefined level so as to generate a long-touch input. The pocket area may be displayed in the shape of a pocket such as a jetted pocket.

Thereafter, if one of the plurality of icons on the operation screen, i.e., a first icon, is dragged into the pocket area (S215), the controller 180 may make the first icon disappear into the pocket area as if the first icon were actually put into a real pocket (S220). When the first icon disappears into the pocket area, a predefined sound or haptic effect may be generated in order to alert a user.

Thereafter, the controller 180 may generate a folder icon in the pocket area and may display the folder icon at a location where the first icon was originally displayed (S225). The folder icon may be an icon representing a folder including the first icon. If the folder icon is selected by a touch input, the icons included in the folder represented by the folder icon may all be displayed in a thought balloon or a popup window. Other icons on the operation screen may be included in the folder represented by the folder icon simply by being dragged over the folder icon.

If a user input other than dragging one of the icons on the operation screen into the pocket area is detected (S230), the controller 180 may control an operation corresponding to the detected user input to be performed (S235). If a communication event such as an incoming call or message occurs, the controller 180 may also control an operation relevant to the communication to be performed.

According to this exemplar embodiment, it is possible to easily perform various operations such as creating a new folder and saving icons in the new folder by setting a pocket area on one side of a display screen and dragging any desired icons into the pocket area.

Figure 5:
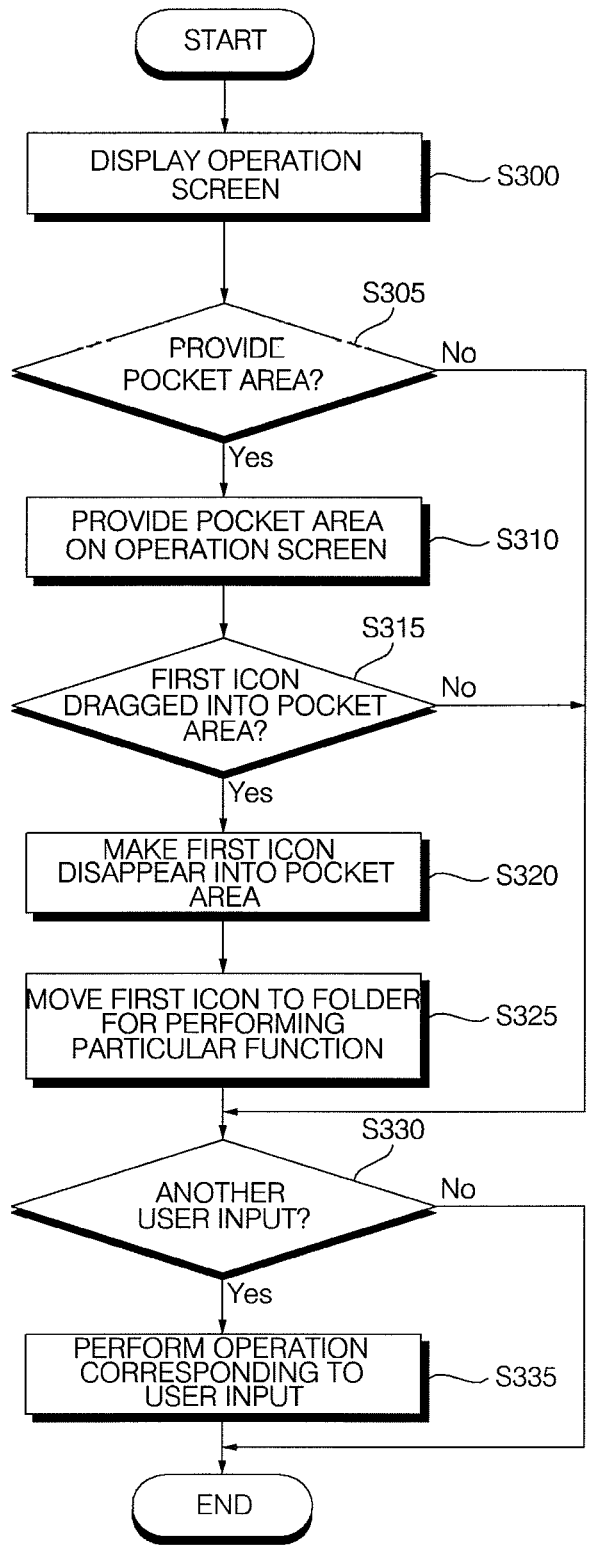
FIG. 5 illustrates a flowchart of a method of controlling a mobile terminal, according to another exemplary embodiment of the present invention.

FIG. 5 illustrates a flowchart of a method of controlling a mobile terminal, according to another exemplary embodiment of the present invention. Referring to FIG. 5, operations S300 through S310, 5330 and S335 are almost the same as their respective counterparts of FIG. 4.

If one of a plurality of icons displayed on an operation screen, i.e., a first icon, is dragged into a pocket area on one side of the operation screen (S315), the controller 180 may save the first icon in a predefined folder for performing a particular function (S325).

Examples of the particular function include, but are not limited to, a 'trash' function and a 'clipboard' function. That is, an icon dragged into the pocket area may be saved in a 'trash' folder or a 'clipboard' folder. An icon saved in the 'trash' folder may be completely deleted or may be restored according to the choice of a user. An icon saved in the 'clipboard' folder may be used in copy and paste operations.

More specifically, one or more icons, if any, saved in the 'trash' folder may be restored or completely deleted by long-touching a pocket area for use as a 'bin.' Alternatively, when a portion of text or an image is selected by a touch-and-drag operation, a pocket area for use in a 'copy' operation and a pocket area for use in a 'cut' operation may be provided on the left and right sides, respectively, of the operation screen. Then, if a particular location to which copied text or a copied image is to be pasted is selected by a long touch, a 'paste' menu may be displayed.

The shape or color of the pocket area may vary according to the operating state of the mobile terminal 100. For example, when one or more icons are saved in the 'trash' or 'clipboard' folder, the shape or color of the pocket area may be changed. In this manner, the pocket area may be used as a 'trash' or a 'clipboard.'

If a folder creation mode is selected by a long touch of a particular icon on the operation screen, a first pocket area for creating a new folder and a second pocket area for use as a 'trash' may both be provided on the operation screen. For example, the first and second pocket areas may be provided at the top and bottom, respectively, of the operation screen.

This exemplary embodiment has been described, taking icons as an example, but the present invention is not restricted to this. That is, this exemplary embodiment can be applied various objects, other than icons, such as images or text.

FIGS. 6 through 11 illustrate diagrams for explaining the exemplary embodiments of FIGS. 4 and 5.

Figure 6:
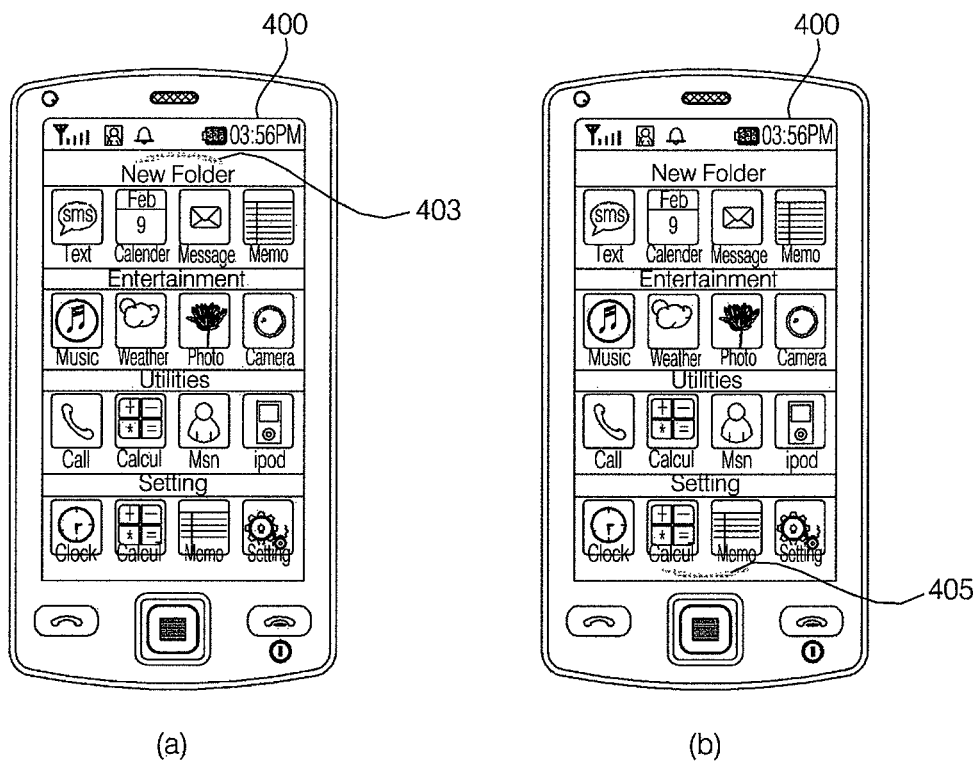
FIGS. 6 through 11 illustrate diagrams for explaining the exemplary embodiments of FIGS. 4 and 5.

FIG. 6 illustrates diagrams for explaining examples of how to set one or more pocket areas on an operation screen. Referring to FIG. 6(a), a pocket area 403 may be provided at the top of an operation screen 400 on which a plurality of icons are arranged. Alternatively, referring to FIG. 6(b), a pocket area 405 may be provided at the bottom of the operation screen 400.

The pocket area 403 or 405 may be provided on the operation screen 400 to perform various functions such as creating a new folder. The pocket area 403 or 405 may be provided on the left or right side of the operation screen 400, instead of at the top or bottom of the operation screen 400. More than one pocket area 403 or 405 may be provided on the operation screen and may thus be used for different purposes.

Figure 7:
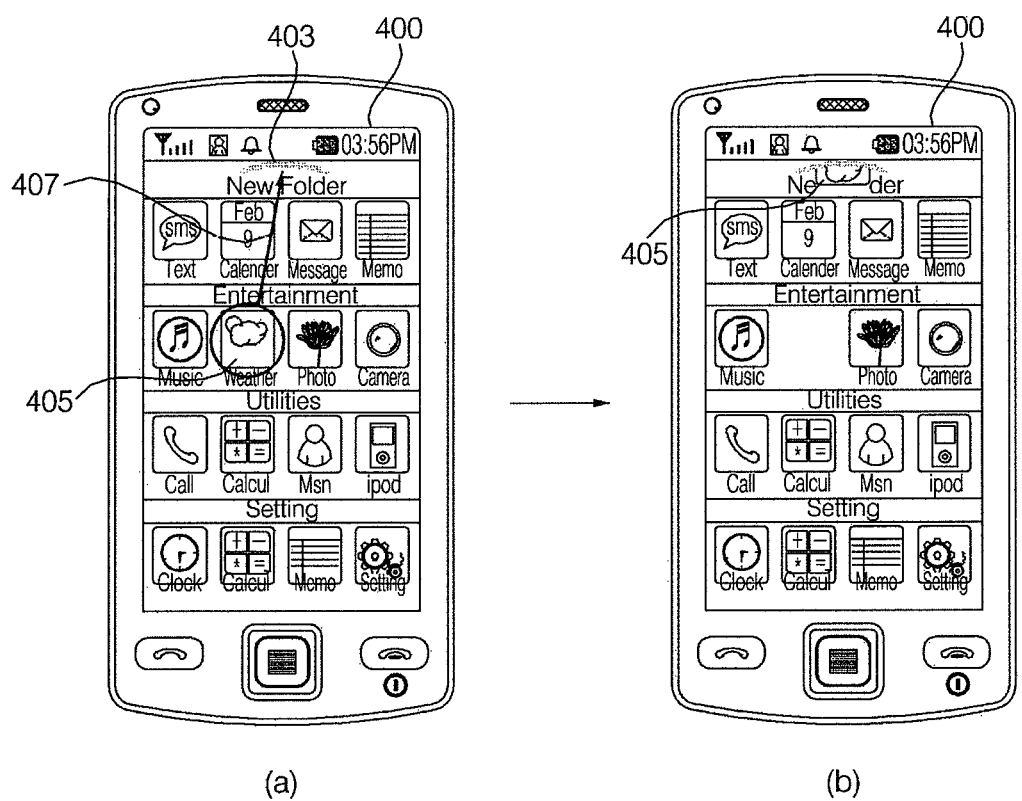
Figure 8:
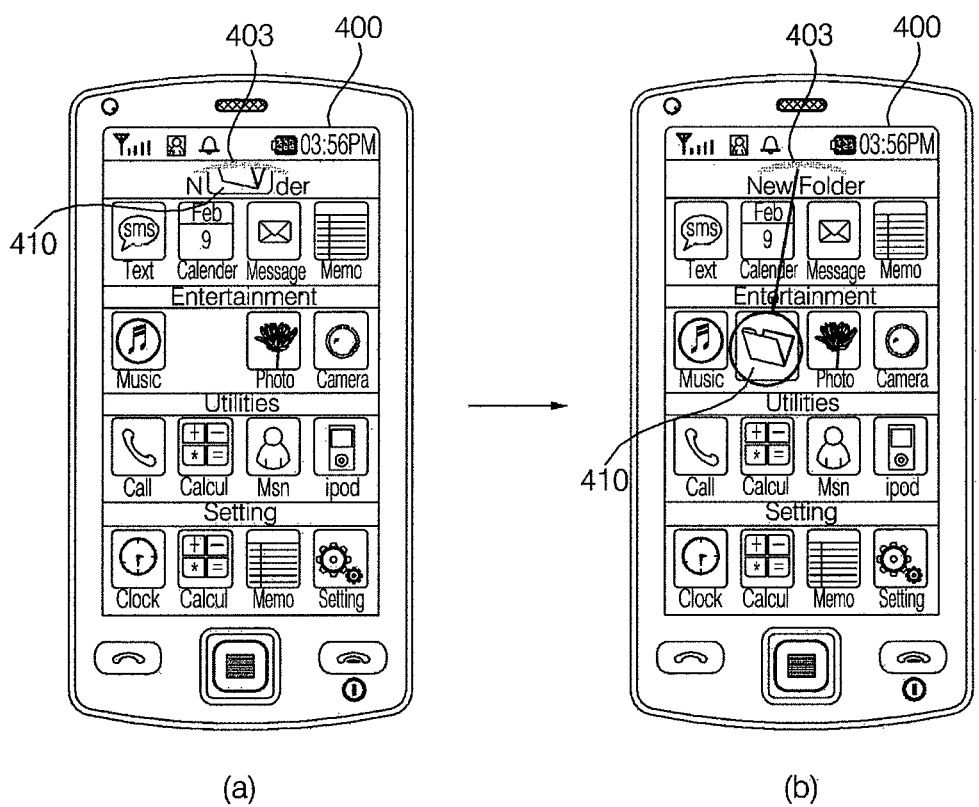
Figure 9:
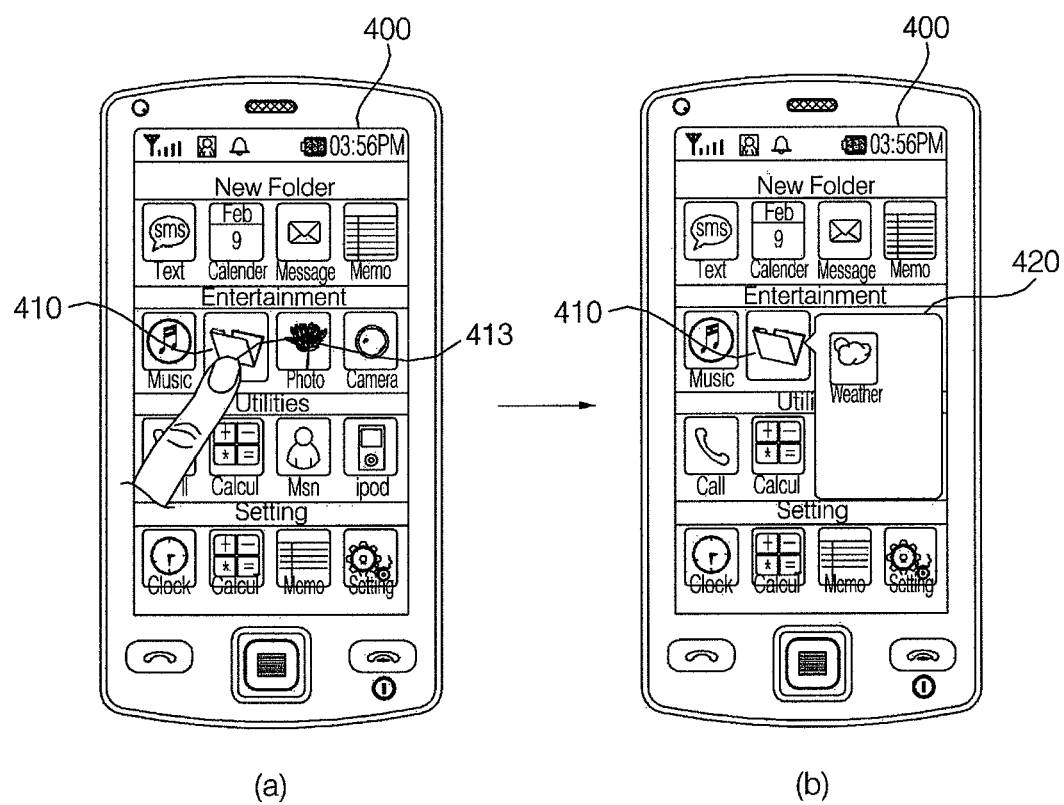

FIGS. 7 through 9 illustrate diagrams for explaining an example of how to set a pocket area for creating a new folder on an operation screen. Referring to FIGS. 7(a) and 7(b), if a first icon 405 is dragged into a pocket area 403 on an operation screen 400, as indicated by reference numeral 407, the first icon 405 may disappear into the pocket area 403 as if it were actually put into a real pocket.

Referring to FIG. 8(a), when the first icon 405 disappears into the pocket area 403, a folder icon 410 may be generated in the pocket area 403. Then, referring to FIG. 8(b), the folder icon 410 may be displayed at a location where the first icon 405 was originally displayed.

Referring to FIGS. 9(a) and 9(b), if the folder icon 410 is selected by a touch 413, a thought balloon 420 showing one or more icons, if any, included in a folder represented by the folder icon 410 may be displayed. Alternatively, a character input window for naming the folder icon 410 may be displayed.

Figure 10:
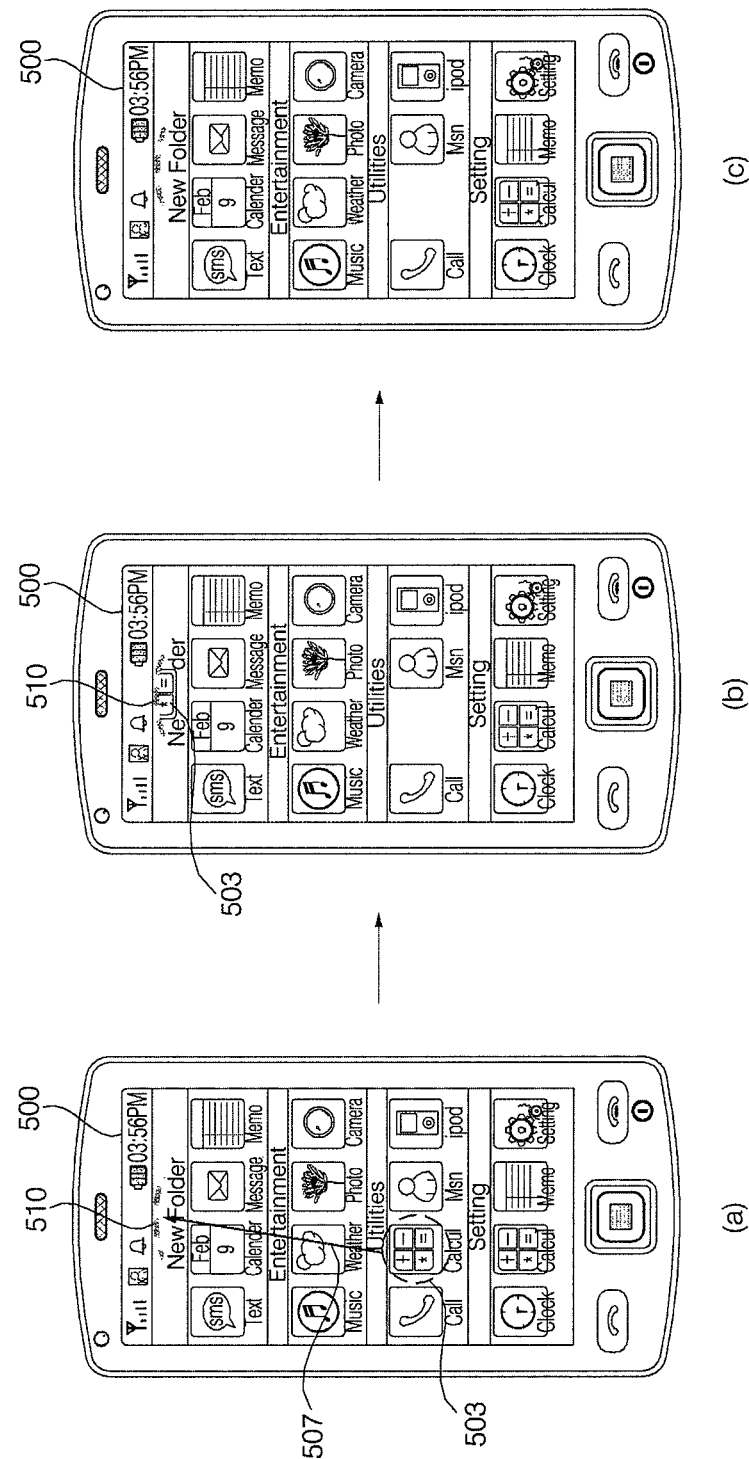

FIG. 10 illustrates diagrams for explaining an example of how to use a pocket area as a 'trash' or a 'clipboard.' Referring to FIGS. 10(a) through 10(c), if an icon 503 is dragged into a pocket area 510 on an operation screen 500, as indicated by reference numeral 507, the icon 503 may disappear into the pocket area 510. The pocket area 510 may be used as a 'trash' or 'clipboard.' During a folder creation mode, if the bottom of the operation 500 is touched and then dragged upwards, a pocket area for use as a 'trash' may be displayed on the operation screen 500.

When the pocket area 510 is used as a 'bin,' an icon dragged into the pocket area 510 may be moved to a 'trash' folder. When the pocket area 510 is touched, one or more icons, if any, in the 'trash' folder may be completely deleted or restored according to the choice of a user.

Alternatively, the pocket area 510 may be used as 'clipboard.' In this case, an icon dragged into the pocket area 510 may be saved in a 'clipboard' folder. Then, when the pocket area 510 is touched, one or more icons saved in the 'clipboard' folder may be displayed. Thus, the user can copy any one of the displayed icons to any desired location on the operation screen 500.

Figure 11:
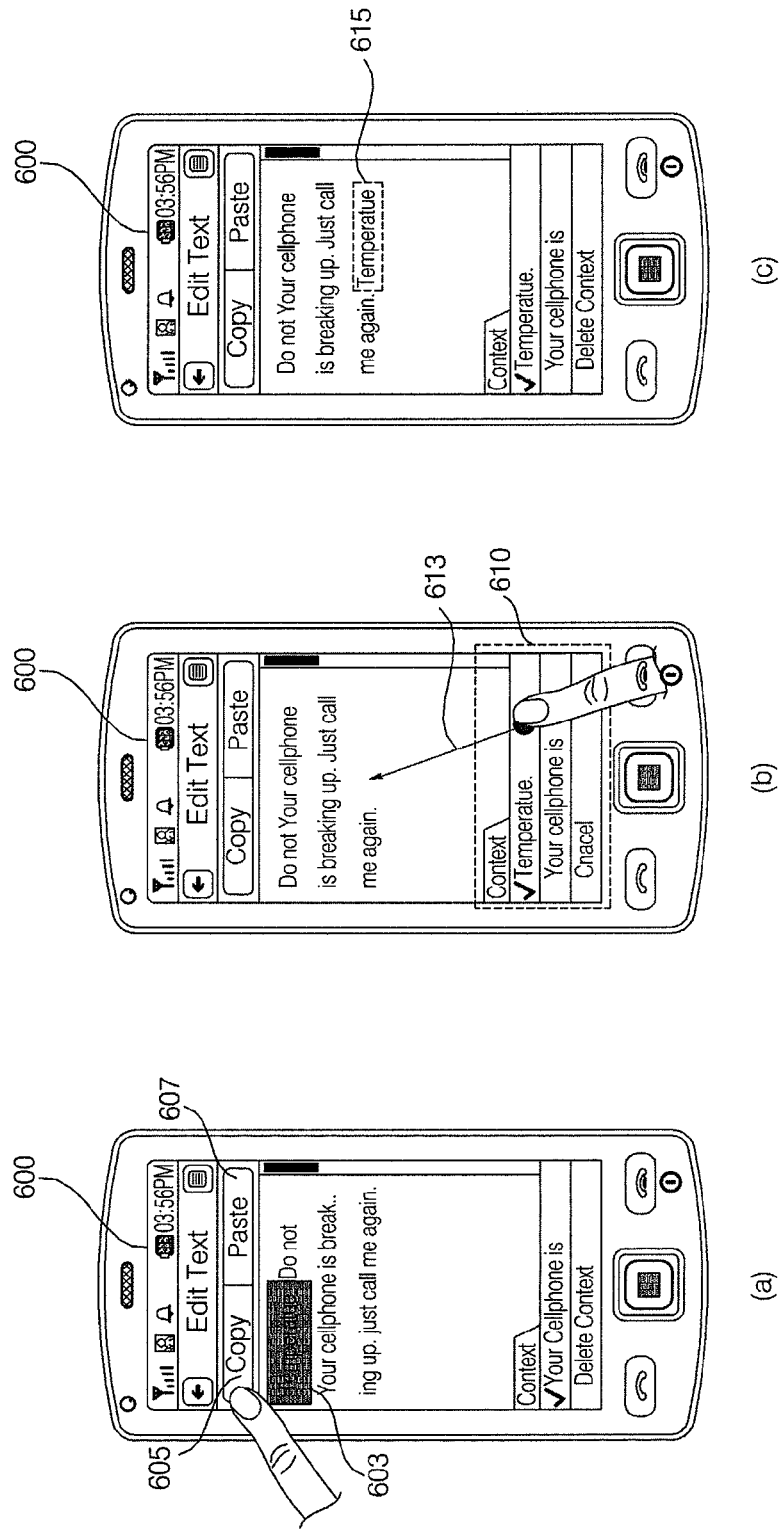

FIG. 11 illustrates diagrams for explaining an example of how to use a pocket area in 'copy' and 'paste' operations. Referring to FIGS. 11(a) and 11(b), if a text block 603 to be copied is selected from a 'edit text' screen 600 and a 'copy' icon 605 is touched, the text block 603 may be registered in a 'context' list 610, which is displayed at the bottom of the 'edit text' screen 600.

Referring to FIGS. 11(b) and 11(c), if one of a number of phrases registered in the 'context' list 610, i.e., a phrase 615, is dragged, as indicated by reference numeral 613, the phrase 615 may be pasted to a location where it is dropped.

If a 'paste' icon 607 is selected when none of the phrases in the 'context' list 610 are yet chosen, the most recently-copied phrase in the 'context' list 610 may be pasted to a position currently being pointed to by a cursor. On the other hand, if the 'paste' icon 607 is selected when one of the phrases in the 'context' list 610 is selected, the selected phrase may be pasted to the position currently being pointed to by the cursor.

In short, a pocket area can be used for various purposes according to the type of operation performed by the mobile terminal 100 or the type of application used by the mobile terminal 100.

The present invention can be realized as code that can be read by a processor included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, it is possible to create a folder for saving icons therein by setting a pocket area on one side of a display screen according to the choice of a user and dragging any desired icon into the pocket area. In addition, it is possible to provide a pocket area for use as a 'trash' or a 'clipboard.' Moreover, it is possible to provide a pocket area for various other purposes related to the management of icons.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a mobile terminal, the method comprising:
    displaying, on a display module of the mobile terminal, an operation screen on which a plurality of icons are arranged;
    displaying at least one pocket area on one side of the operation screen;
    receiving, on the display module, a dragging input for dragging a first icon of the plurality of icons into the at least one pocket area, wherein the first icon disappears into the at least one pocket area in response to the dragging input while the operation screen is displayed;
    generating a new icon in the at least one pocket area and making the new icon appear from the at least one pocket area in response to the dragging input, wherein the new icon corresponds to a folder icon representing a folder including the disappeared first icon;
    automatically moving the new icon from the at least one pocket area to a location where the disappeared first icon was originally displayed without a further dragging input;
    displaying the new icon at the location where the disappeared first icon was originally displayed; and
    displaying the disappeared first icon included in the new icon on the operation screen as a thought balloon or a popup window upon receiving a command to select the new icon.

2. The method of claim 1, wherein the displaying the at least one pocket area comprises:
    activating a folder creation mode; and
    providing at least one pocket area on one side of the operation screen.

3. The method of claim 2, further comprising:
    activating the folder creation mode by receiving (i) a first touch input on a particular region of the display module or a particular icon on the operation screen, (ii) a second touch input on any one of the plurality of icons on the operation screen for more than a predefined amount of time, or (iii) a third touch input with a pressure higher than a predefined level generating a long-touch input.

4. The method of claim 1, wherein the folder icon comprises one or more icons.

5. The method of claim 4, further comprising;
    receiving a second dragging input for dragging another one of the plurality of icons into the folder icon; and
    displaying the other one of the plurality of icons in the folder icon, wherein the dragged one of the plurality of icons is saved to be a part of the folder icon.

6. A mobile terminal comprising:
    a display module configured to display an operation screen on which a plurality of icons are arranged; and
    a controller configured to:
    control the display module to display at least one pocket area on one side of the operation screen,
    make a first icon of the plurality of icons disappear into the at least one pocket area while the operation screen is displayed when a dragging input for dragging the first icon into the at least one pocket area is received,
    generate a new icon in the at least one pocket area and make the new icon appear from the at least one pocket area in response to the dragging input, wherein the new icon corresponds to a folder icon representing a folder including the disappeared first icon,
    automatically move the new icon from the at least one pocket area to a location where the disappeared first icon was originally displayed without a further dragging input,
    control the display module to display the new icon at the location where the disappeared first icon was originally displayed, and
    control the display module to display the disappeared first icon included in the new icon on the operation screen as a thought balloon or a popup window upon receiving a command to select the new icon.

7. The mobile terminal of claim 6, wherein the controller is configured to activate a folder creation mode to display the at least one pocket area in response to a user input.

8. The mobile terminal of claim 7, wherein the user input corresponds to one of the following:
    a first touch input to a particular region of the display module or a particular icon;
    a second touch input to any one of the plurality of icons on the operation screen for more than a predetermined amount of time; or
    a third touch input corresponding to a pressure higher than a predetermined level for generating a long-touch input.

9. A method of controlling a mobile terminal, the method comprising:
    displaying, on a display module of the mobile terminal, an operation screen on which a plurality of objects are arranged;
    displaying a first pocket area for creating a new folder on one side of the operation screen and a second pocket area for performing a predefined function on another side of the operation screen when any one of the plurality of objects is touched for more than a predefined amount of time;
    receiving, on the display module, a first dragging input for dragging a first object of the plurality of objects into the first pocket area;
    in response to the received first dragging input, making the first object disappear into the first pocket area, and generating a new folder in the first pocket area, and automatically moving the new folder from the first pocket area to a location where the disappeared first object was originally displayed without a further dragging input, the new folder including the disappeared first object;
    receiving, on the display module, a second dragging input for dragging a second object of the plurality of objects into the second pocket area; and
    in response to the received second dragging input, making the second object disappear into the second pocket area and saving the disappeared second object in a folder for performing the predefined function.

10. The method of claim 9, wherein the predefined function includes one of a 'trash' function, a folder creation function, a 'cut' function, a 'copy' function, a 'paste' function and a 'clipboard' function.

11. The method of claim 9, wherein the plurality of objects are icons.

12. The method of claim 9, further comprising:
generating a plurality of pocket areas, each of the plurality of pocket areas performing different predefined functions on the operation screen.

13. A mobile terminal comprising:
a display module configured to display an operation screen on which a plurality of objects are arranged; and
a controller configured to:
control the display module to display a first pocket area on one side of the operation screen and a second pocket area for performing a predefined function on another side of the operation screen when any one of the plurality of objects is touched for more than a predefined amount of time,
detect a first dragging input for dragging a first object of the plurality of objects into the first pocket area from the display module,
in response to the detected first dragging input, make the first object disappear into the first pocket area, and generate a new folder in the first pocket area, and automatically move the new folder from the first pocket area to a location where the disappeared first object was originally displayed without a further dragging input, the new folder including the disappeared first object,
detect a second dragging input for dragging a second object of the plurality of objects into the second pocket area from the display module, and
in response to the detected second dragging input, make the second object disappear into the second pocket area and save the disappeared second object in a folder for performing the predefined function.

14. The mobile terminal of claim 13, wherein the predefined function includes one of a 'trash' function, a folder creation function, a 'cut' function, a 'copy' function, a 'paste' function and a 'clipboard' function.

15. The mobile terminal of claim 13, wherein the plurality of objects are icons.

16. The mobile terminal of claim 13, wherein the controller is further configured to generate a plurality of pocket areas and to set each of the plurality of pocket areas to perform different predefined functions on the operation screen.

\* \* \* \* \*